United States Patent
Östbo

(10) Patent No.: US 6,335,192 B1
(45) Date of Patent: Jan. 1, 2002

(54) COMPOSTING ARRANGEMENT

(76) Inventor: Bertil Östbo, Byvägen 84, S-151 52 Södertälje (SE)

(*) Notice: Subject to any disclaimer, the term of this patent is extended or adjusted under 35 U.S.C. 154(b) by 0 days.

(21) Appl. No.: 09/530,669

(22) PCT Filed: Nov. 11, 1998

(86) PCT No.: PCT/SE98/02041

§ 371 Date: May 4, 2000

§ 102(e) Date: May 4, 2000

(87) PCT Pub. No.: WO99/26899

PCT Pub. Date: Jun. 3, 1999

(30) Foreign Application Priority Data

Nov. 11, 1997 (SE) .............................................. 9704125

(51) Int. Cl.7 ................................................. C05F 3/06
(52) U.S. Cl. ...................... 435/290.1; 4/484; 4/DIG. 12
(58) Field of Search ......................... 435/290.1–290.4; 71/8–10, 12, 13; 4/484, DIG. 12

(56) References Cited

U.S. PATENT DOCUMENTS 1,223,711 A * 4/1917 Mershon
3,203,007 A * 8/1965 Olson
3,448,467 A * 6/1969 Smith
3,927,985 A * 12/1975 Hyttinge et al.
4,621,380 A * 11/1986 McGill

FOREIGN PATENT DOCUMENTS

| DE | 27 07 568 | 11/1977 |
| GB | 1 339 521 | 12/1973 |
| GB | 2 087 860 | 6/1980 |
| SE | 420 308 | 9/1981 |

* cited by examiner

Primary Examiner—William H. Beisner
(74) Attorney, Agent, or Firm—Sughrue Mion, PLLC

(57) ABSTRACT

Composting device for night soil and other biodegradable material, comprising a receptacle for receiving the material to be composted and on the bottom of which a starting bed is to be spread out. The receptacle comprises an inner, seal-tight lining in the form of a sack (10) made from a flexible, liquid-impermeable material and a carrier (1) intended to support the sack. The sack is constructed with liquid drains (14) for the drainage of liquid which is separated from the composting material. The carrier (1) and the sack-lined receptacle are arranged such that they can be transported as a unit to a depot after the sack (10) has been wholly or partially filled. The bottom of the carrier (1) is constructed with openable hatches (8), which allow the sack (10) with its contents to be deposited in the depot through the said bottom when the carrier (1) is lifted.

11 Claims, 5 Drawing Sheets

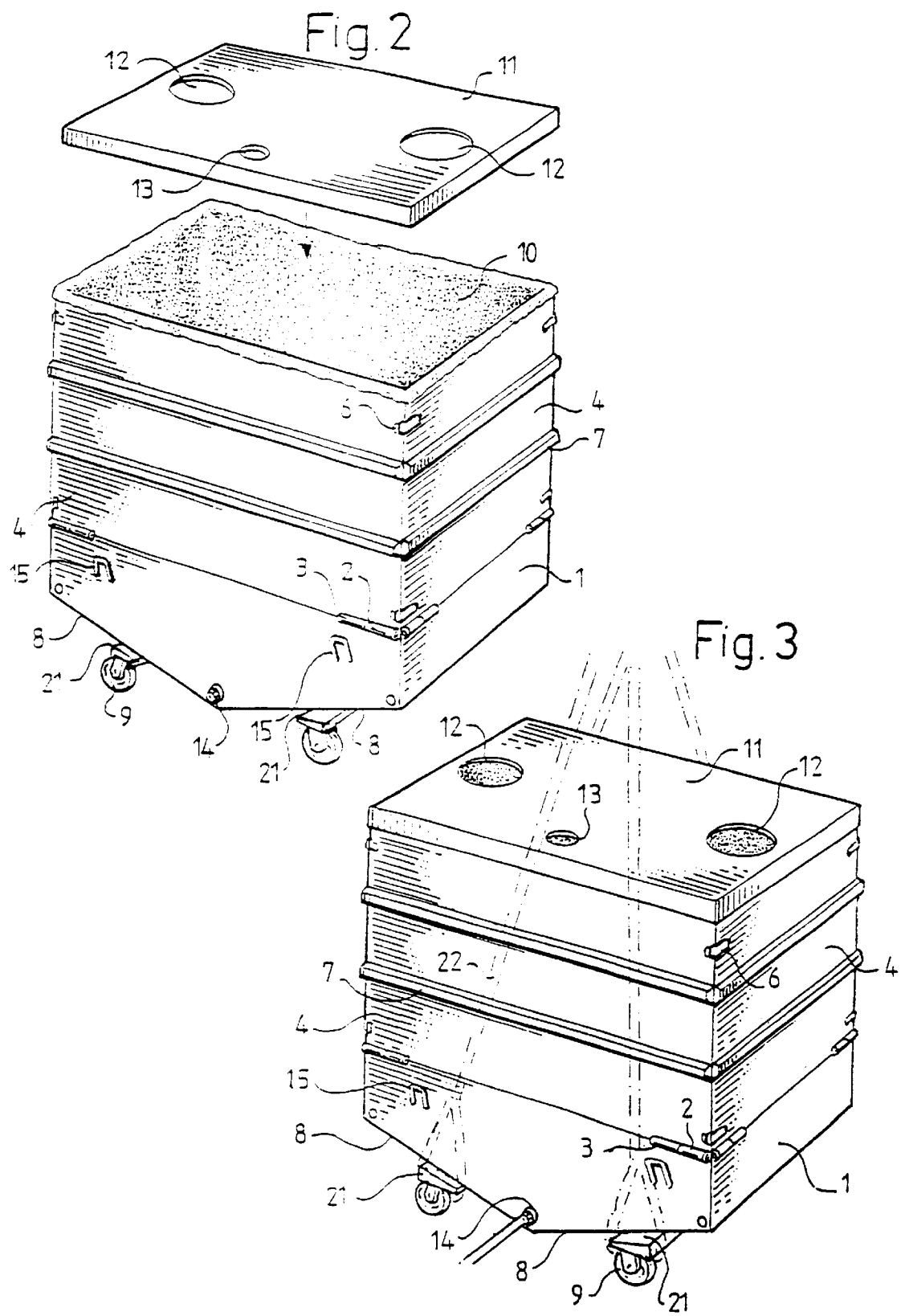

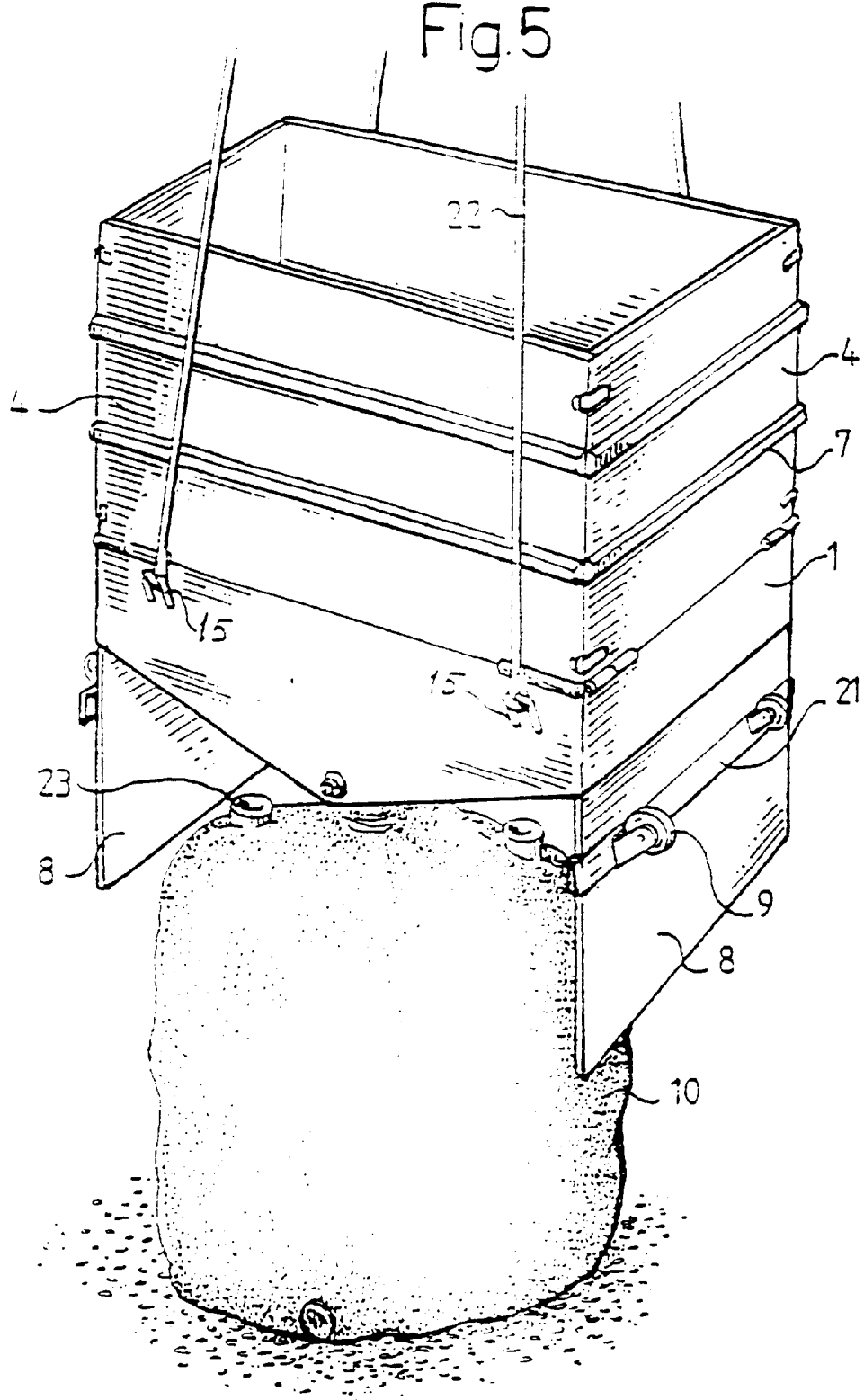

COMPOSTING ARRANGEMENT

The present invention relates to a composting device for night soil and other biodegradable material, comprising a receptacle for receiving the material to be composted and on the bottom of which a starting bed is to be spread out, which receptacle comprises an inner, seal-tight lining in the form of a sack made from a flexible, liquid-impermeable material and a carrier intended to support the sack, the sack being constructed with liquid drains for the drainage of liquid which is separated from the composting material.

Composting devices of the above-specified type represent, from an environmental viewpoint, a substantially better alternative for the handling of biodegradable material than the water-rinsing systems frequently used at present, which result in serious and accelerating environmental destruction and high wastage of drinking water, which is one of our most vital natural resources. A more detailed description of the decomposition process which is employed is not included here, since this is well documented in earlier patent specifications.

In order for composting devices of this type, which, apart from night soil, can also manage other degradable domestic waste, to acquire a wider practical use, the devices are required to be simple to operate, adaptable to different requirements and preconditions and should allow simple rectification of operating breakdowns, for example following sabotage or misuse.

In my earlier Swedish patent application 9504794-9, a composting device is described in which the decomposition of the material takes place in a fixed receptacle, formed compost earth being removed through a lower hatch. This device works well in many cases but is open to improvement in certain regards. This applies, inter alia, to the raking-out of the compost earth, which is effected by opening the hatch and raking the earth out into an open vessel. This can be rather unpleasant, especially where the receptacle is placed in a living area or the like.

Following sabotage or misuse, for example, in which, for example, an agent intended for a chemical toilet has been poured down into the compost, thereby bringing an end to the decomposition process, removing and replacing the compost bed with a new starting bed is a time-consuming and disagreeable task, since the freshly delivered material has to be raked out into an open vessel. Corresponding problems can arise in connection with temporary overloading of a toilet installation, which results in the receptacle having to be emptied before the material has managed to decompose. This problem also arises in the temporary use of composting devices of this type in, for example, refugee camps or at other sites where large numbers of people are gathered for an indefinite period. When such a camp is to be broken up, the composting receptacles also contain fresh night soil, which has to be managed. Here there may also be risks of spreading of pathogenic bacteria. In order to kill such bacteria, a composting period of about 2 years is required.

The use of toilet installations having fixed receptacles also gives rise, in another context, to problems resulting from the limited capacity, since, when overloaded, they have to be shut off to allow the natural process to catch up, which means that the entire toilet must be kept shut during the recovery period. This is a serious limitation in connection with public installations, since it is costly to set up reserve toilets.

Certain previously used receptacles are provided with a tank which is openly connected to a receptacle. In these, leakage risks are also present in connection with overfilling of liquid in the receptacle.

GB-A-2087860 describes a device for producing liquid fertilizer from, above all, garden waste. The device does not therefore constitute a composting device of the type to which the invention relates, in which a starting bed is prepared in the receptacle and compostable material is then successively delivered over a lengthy period as previously delivered material continues to be broken down. In the previously known device for obtaining fertilizer, a sack is filled full of garden waste in one operation, after which liquid formed is collected. In addition, the flexible sack is constructed with a perforated bottom, which means that it cannot be sealed without liquid always being able to escape through the perforations.

A main object of the present invention is to achieve a cheap and simple composing device which solves, inter alia, the aforementioned problems regarding the management of compost earth and composting material in the course of decomposition, as well as the problem with the limited capacity of toilet installations having fixed receptacles.

The basis for the invention is the realization that the solid material left in a composting toilet after separation of the liquid is reduced by 95–98% in terms of volume during the composting. This means that the compost earth formed can be collected in a receptacle over a long period. The receptacle may then be emptied of all material, including both compost earth and fresh composting material that has been delivered.

According to the invention, the composting must in this case take place in a sack made from liquid-impermeable material, which only needs to be changed at long time intervals and can also be used for the maturing of fresh material for a further 1 to 2 years at a suitable site, if required.

The invention is therefore based on a concept different from that of the previously known inventions. In these, the composting is effected in a fixed receptacle and compost earth is raked out as and when it is formed. According to the invention, the composting takes place in a closed sack which is changed once it is full. It contains in this case both compost earth and non-fully decomposed material and is therefore left to mature at a suitable site.

What is especially characteristic of a composting device of the type indicated in the introduction is, according to the present invention, that the carrier and the sack-lined receptacle are arranged such that they can be transported as a unit to a depot after the sack has been wholly or partially filled, and that the bottom of the carrier is constructed with openable hatches, which allow the sack with its contents to be deposited in the depot through the said bottom when the carrier is lifted.

The fact that the composting takes place in a sack enables all the composting material, both old and fresh, to be easily removed should this be required, for example as a result of the decomposition process having come to a halt. After this, a new sack is inserted, containing a working compost bed. All handling of the composting material up to its total decay will be conducted in a closed but aerated sack, which, inter alia, prevents spreading of pathogenic bacteria. The closed sack can additionally be handled without inconvenience, including in furnished rooms. Nor is there any risk of liquid leakage during transportation and storage of the sack.

Should overloading occur, furthermore, a full sack can be removed directly and transported to a depot for maturing and be replaced by a new sack with compost bed. Alternatively, the receptacle containing the full sack can be put aside for a while and subsequently reinserted once the volume has been reduced due to the ongoing decomposition process.

In order to facilitate the depositing of the sack, in a preferred embodiment the carrier is constructed with bottom hatches, which can be op ened by being swung downwards in order to free the sack as the carrier is lifted. The sack can thus be deposited on the ground without having needed to be handled without support.

The sack expediently contains a screening device connected to the liquid drains of the sack. In a preferred embodiment, the screening device has the form of a perforated pipe extending over the bottom of the sack.

Since the seal of the composting receptacle is formed by the sack, the receptacle can otherwise have a simple construction allowing it to be mounted on the spot, which, inter alia, means that freight and storage costs can be minimized. The wall sections can in this case comprise simple panels made from cheap material.

The fact that the wall of the sack is supported by stiff wall sections and the transportation of the sack takes place whilst it is still supported by these sections and the underlying carrier, means that the sack can be made from a relatively thin and cheap plastics material, expediently a material which decomposes in nature after a few years.

The sloping plane is expediently constructed with grooves running in the direction of slope and in which liquid which is separated from the composting material is conducted to the drains of the sack. The liquid is spread over the plane, preventing all the liquid being channelled to a tunnel formed in the material.

The sloping plane is preferably situated beneath and forms a supporting surface for the sack. The plane can have the form of a separate unit, similar to a corrugated sheet, which is supported by the carrier.

In a preferred embodiment, the device comprises a lid, which fits over the wall sections mounted on the carrier. The sack can be held in place by its upper edge portion being folded over the upper edges of the wall sections and being pressed firmly against these by the lid.

The wall sections expediently have the form of stiff panels, the lower edges of which are fixed pivotably to the carrier and which, once mounted, are locked together to form a supporting shell for the sack.

The carrier is preferably constructed with two sloping planes, which can slope either towards or away from each other. A screening device is in this case disposed in the sack parallel to the lower edge of the respective sloping plane.

Other special features and characteristics of the invention are evident from the patent claims.

The invention will be described in detail below with reference to the embodiments shown by way of example on the appended drawings.

FIG. 2 shows the shell after being mounted and after it has been provided with an inner, sealing layer in the form of a sack.

FIG. 3 shows the complete receptacle with lid.

FIG. 5 illustrates how a full sack can be deposited at a desired site.

Figure 1:
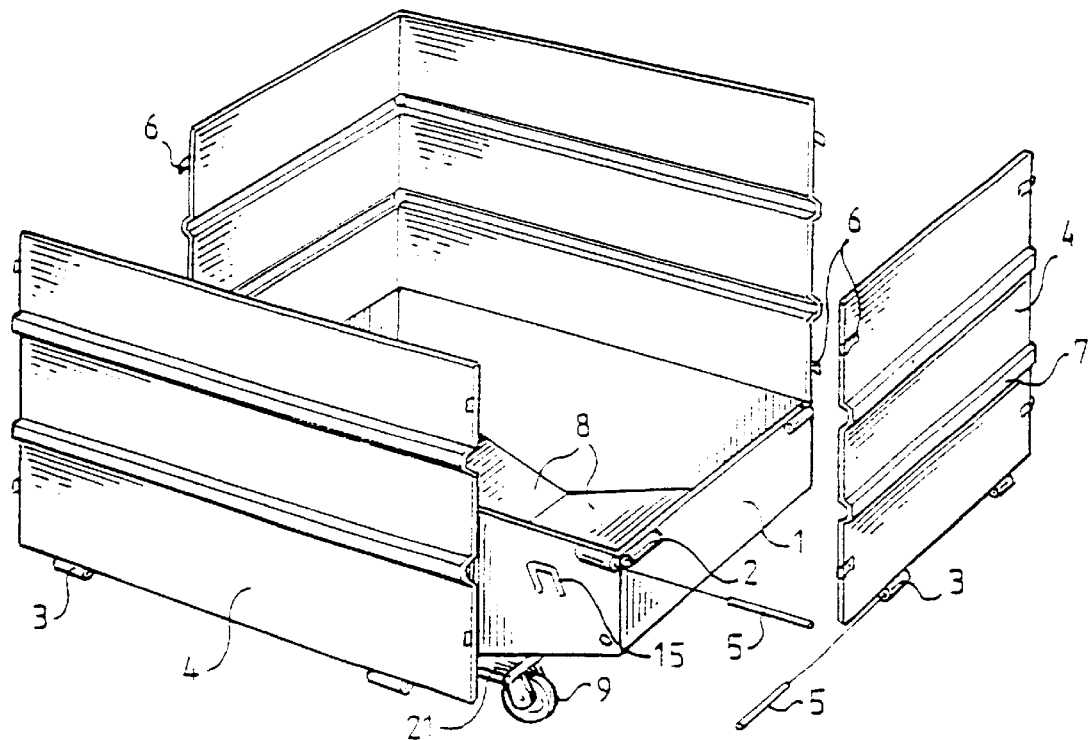
FIG. 1 illustrates the structure of the shell for a composting receptacle according to the invention.

It can be seen from FIG. 1 that the outer, supporting shell of the composting device comprises a carrier 1, constituting a bottom support for an inner, sealing layer in the form of a plastics sack made from thin material. The carrier 1 is constructed with hinge-like members 2, which can be connected to corresponding members 3 on supporting walls 4 by means of cotters 5. The supporting walls 4 can be raised by being swung into a vertical position, in which they are locked tightly together using clamping devices 6 or the like. The supporting walls 4 are constructed in the form of stiff panels made from light material such as plywood, plastic, concrete or plating. If required, the panels can be provided with reinforcing grooves 7 or the like. The panels should be constructed such that they can be stacked one upon the other with minimum possible interspace in order to reduce necessary volume with respect, for example, to air freight. Apart from by hinge members 2, 3, the panels 4 can be fixed to the carrier 1 in some other way, for example using suitable profile mouldings. They can also stand loose upon or inside the upwardly projecting wall sections of the carrier. The reciprocal locking between the panels can also be effected through the use of profile mouldings.

In this embodiment, the supporting surface of the carrier 1 for the inner sack is constructed in the form of two planes 8 which slope towards each other. As a result of the flexibility of the sack, the bottom of the latter will adjust its shape to the sloping planes, which will thereupon serve as conveying members for the liquid which is separated from the compost material. The carrier 1 is futher provided with pivotable castors 9 to allow easy manoeuvring and adjustment of the said carrier within a toilet housing and possible conveyance to a neighbouring depot. The castors also allow the receptacle to be transported easily between various positions in a space beneath a toilet housing, such that the excrement can be distributed in a plurality of heaps over the composting bed in the receptacle in order to increase the total capacity of the receptacle. The castors 9 are mounted on beams 21, which protrude somewhat beyond the side edges of the carrier 1 for reasons which will be described below.

FIG. 2 depicts the stiff shell, formed by the carrier 1 and the panels 4, for an inner, sealing layer in the form of a thin plastics sack 10. 11 denotes a lid, which can be pressed down over the upper edges of the side walls 4 in order to secure that edge of the plastics sack 10 which has been folded over the said side walls. The lid will also at the same time stabilise the supporting walls. The lid is provided with two openings 12 for connection to a respective toilet bowl and an opening 13 for connection to a ventilation duct. The lid can be provided with more openings if required.

14 denotes a pipe socket which is connected to a screening device, disposed in the sack 10 and parallel to the lower edges of the sloping planes 8, for conducting liquid out of the sack. The pipe socket 14, which is provided with shut-off members, is intended to be connected to a collecting tank for nutrient liquid. An earth filter can possibly be disposed in front of the tank, for example, cf. the description below of FIG. 10. The notation 15 relates to two lifting eyes, which are disposed on either side of the carrier 1 and are used in the depositing of the sack, as will be described below.

FIG. 3 shows the assembled composting device according to the invention. Since the seal-tightness of the receptacle is guaranteed by an inner lining in the form of a sack 10, no demands are made upon the seal-tightness of the outer shell. As has been described above, this allows the side walls 4 easily to be mounted at the site where the receptacle is to be used. Since the inner sack is further supported by the stiff side walls 4 and the carrier 1 respectively, the sack can be made from a thin and hence cheap plastics material. The material is expediently chosen such that it decomposes in nature when exposed to ultraviolet light for a few years.

Figure 4A:
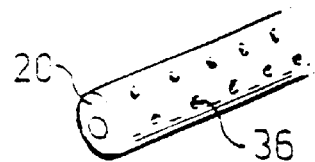
FIG. 4a shows a part of a filter pipe forming part of the receptacle according to FIG. 4.
Figure 4:
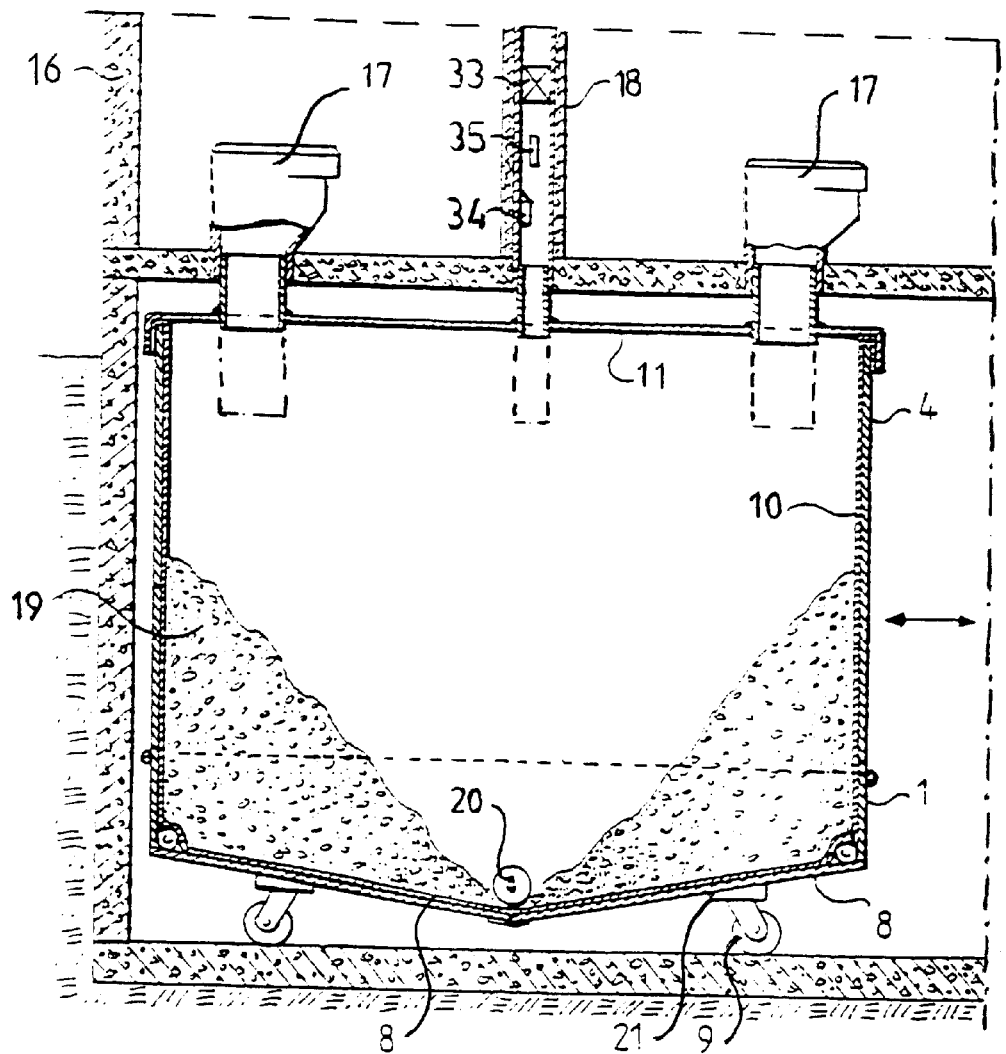
FIG. 4 is a section through a receptacle according to the invention and a part of a toilet housing belonging thereto.

FIG. 4 depicts a composting device according to the invention inserted in a space beneath a toilet housing 16, which is provided with two toilet bowls 17 connected to the openings 12 in the lid 11 of the composting device. 18 denotes a ventilation duct which is connected to the opening 13 in the lid.

It is important that the liquid is separated off and led away from the solid material 19 which is delivered to the sack 10. This is effected by means of the sloping planes 8 and a screening device 20 disposed in the sack. This expediently comprises a pipe perforated with holes 36, see FIG. 4a, which pipe is connected to the pipe socket 14. In connection with the decomposition, the volume of the solid material is in this way reduced by 95–98%. A sack 10 can thus be used for a relatively long time before it becomes full, provided that decomposition material is delivered essentially at the same rate at which the decomposition process advances. When the sack has become full after a long period of use or as a result of temporary overloading of the toilet, it can easily be removed by rolling out the whole of the receptacle on the castors 9 and replacing it with another receptacle holding a new sack in which a new starting bed of compost earth has been prepared. The starting bed may have been supplemented with suitable types of worms and bacteria. All that is required before the exchange is that the connections to the toilet bowls, the ventilation duct and the liquid conduit 19 are released, which can be facilitated through the use of pipes which are telescopically retractable one inside the other. If the sack 10 can be deposited close to the toilet housing, the same carrier with supporting walls 4 can be used after a new sack 10 has been inserted therein and provided with a starting bed.

An evacuation fan, expediently speed-regulated, disposed in the ventilation duct 18 is denoted by 33 and a bulb transmitting a light which attracts flies and other insects which may develop in the compost material is denoted by 34. The lamp 34 is intended to be lit as and when required and is linked to the fan 33 in such a way that the speed of the latter is increased when the lamp is lit. This means that flies, for example, which are attracted to the lamp are effectively sucked out by means of the fan.

The notation 35 relates to a UV-radiation source, which can be used, for example, to eliminate airborne pathogens and odours. A corresponding device can also be disposed in the liquid drains from the sack, if desired.

Should temporary overloading occur, a receptacle holding a full sack can be rolled out and put aside for a while for subsequent reintroduction once the volume has been reduced as a result of the ongoing decomposition process. If the material delivery through the two toilet bowls is uneven, then the device can easily be rotated about 180° in order to balance the uneven load.

The receptacle can alternatively be constructed without a lid and be arranged so as to be able to be pressed up against the ceiling, in a seal-forming manner, in various positions relative to the placement of the toilet bowls. Alternatively, a false ceiling can be arranged to be lowerable onto the receptacle in its various positions. The ceiling interacting with the receptacle is in both cases expediently provided with a soft surface layer, which is pressed in a seal-forming manner against the sack folded over the upper edges of the receptacle walls. Otherwise, the upper edge of the receptacle can be constructed with a sealing member, e.g. an inflatable hose.

Such a non-lidded receptacle can be transported between different positions at desired time intervals in order to distribute the material which falls down onto the compost bed into various heaps. The capacity of the receptacle can thereby be substantially increased. This is described in greater detail in PCT/SE98/01193, the content of which is introduced into the present application by this reference.

FIG. 5 illustrates how the depositing of a full sack 10 is effected. In order to allow simple depositing of the sack without it being manually handled, in this embodiment the sloping planes 8 of the carrier 1 are constructed in the form of hatches, which can be opened in order to free the sack when the carrier 1 is lifted by the stiff side walls 4. As can be seen, the castors 9 are mounted on these hatches, so that the hatches, under normal use according to FIG. 4, are pressed up against the bottom of the sack as a result of the weight of the receptacle. Whenever the receptacle with sack is transported to a site for depositing of the sack, the complete unit is expediently lifted by means of straps 22, which are placed around the protruding portions of the mounting beams 21 for the castors 9. During the lifting operation, the hatches 8 will be kept shut for the same reasons as when the castors are resting on a base.

For depositing of the sack 10, the receptacle with its sack is put down at a desired site, after which the straps 22 are transferred across to the lifting eyes 15. When the receptacle is then re-lifted, the hatches 8 will be opened as a result of the weight of the sack and the sack is automatically deposited on the ground.

All handling of the composting material therefore takes place in a closed sack, which is supported by the supporting walls 4 and the carrier 1 until being deposited at a desired site. In the shown embodiment, the sloping planes 8 can be swung downwards. The design can however be such that they are removed differently, for example by being pulled out laterally.

Prior to the depositing, the sack has been sealed and possibly provided with one or more suitably perforated aerating pipes 23. After the sack 10 has been deposited, the carrier 1 having the supporting walls 4 can be reused without cleaning, since the sack 10 has formed a protection for the outer shell of the composting device.

The only consumable part is therefore constituted by the relatively cheap plastics sack. This means that a change of sack can be made without great expense, including in the case of sabotage or misuse.

Another advantage is that it is easy to spread out a compost bed in a new sack, since this is totally open and easily accessible. This can be done before the supporting walls are mounted or with these lowered.

Using a composting device according to the invention, use can be halted at any time whatsoever, since all material, including the non-fully decomposed material, is handled in a closed sack and liquid spillage from the sack is prevented as a result of the sealable pipe sockets 14. This can be of great value in case of temporary applications in a disaster area, a refugee camp or some other place in which many people are gathered for an indefinite period. The outer shell of the composting device can also be used repeatedly, thereby substantially reducing the cost. Any desired spare capacity can always be found, since all that is needed for this is to have in store the necessary number of plastics sacks. There is therefore no capacity restriction.

Figure 6:
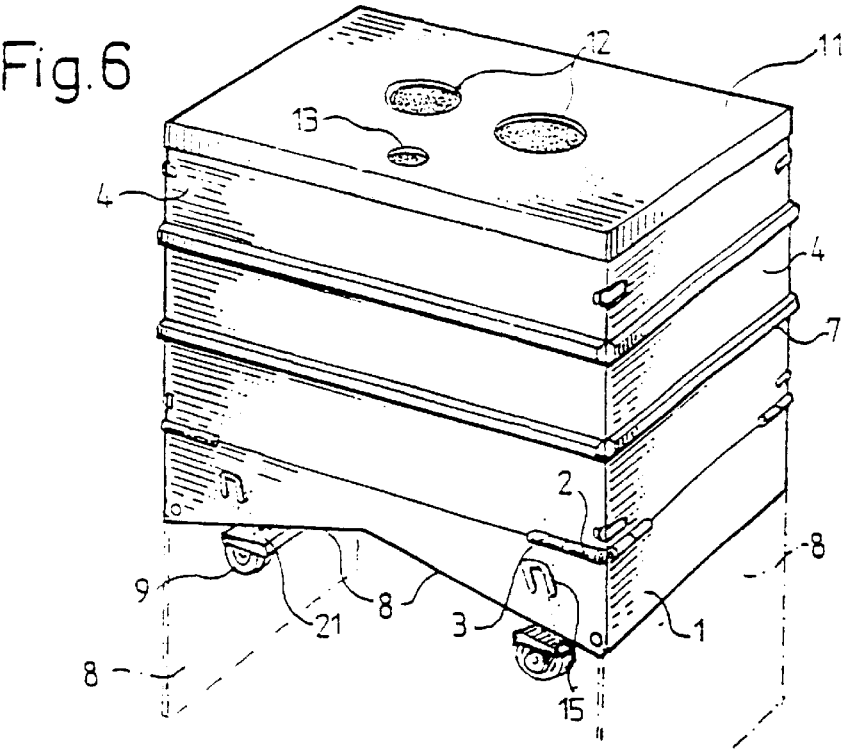
FIG. 6 shows an alternative embodiment of a receptacle according to the invention, having two planes sloping away from each other.

In FIG. 6 an alternative embodiment of a composting device according to the invention is shown, in which the carrier 1 is constructed with two planes 8 sloping away from each other. A screening device is in this case disposed in the sack along the lower edge of each plane. When the sack is deposited, the hatch-shaped, sloping planes 8 can be swung downwards, as shown by means of dash-dot lines. The openings 12 for the toilet bowls are in this case disposed centrally over the highest parts of the sloping planes.

Figure 7:
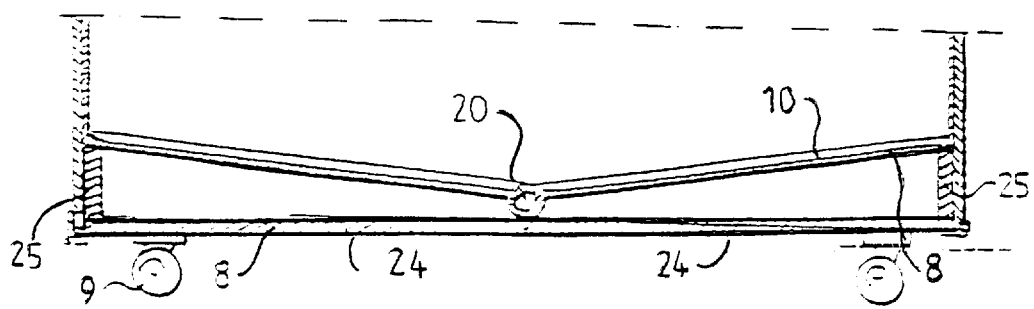
FIGS. 7 and 8 show two further embodiments of the carrier for a receptacle according to the invention.

FIG. 7 shows another embodiment of the carrier 1 provided with castors 9. In this embodiment, the carrier is provided with horizontal hatches 24 to which the beams 21 and the castors are fitted. The sloping planes 8 are inserted as loose panels, which can be given the desired slope through the choice of a suitable height for supporting members 25 for the panels.

Figure 8:
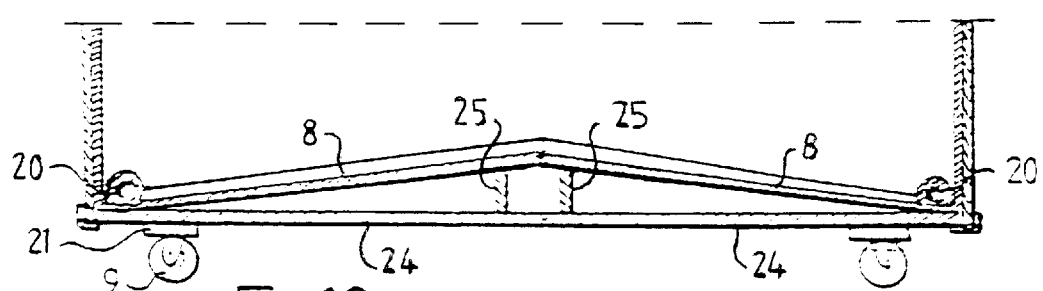

In FIG. 8 the alternative embodiment is shown, in which the sloping planes 8 slope away from each other, a screening device 20 being disposed along each edge of the receptacle.

Figure 9:
FIG. 9 illustrates an embodiment of a sloping plane which can be used in FIGS. 7 and 8.

The planes 8 can consist of suitable material, for example one which decomposes in nature after the sack has been deposited on the ground. The panels can be totally flat but these are preferably constructed with grooves 26 running in the direction of slope, see FIG. 9. The bottom of the sack will adjust to these grooves, which will form channels for the liquid in the sack. This prevents all liquid from flowing through a sole tunnel formed in the composting material on the sloping plane. A more effective conversion of the urine to an essentially odourless nutrient liquid is in this way obtained.

Instead of having the whole panel 8 slope as a sloping plane, an essentially horizontal panel provided with grooves of increasing depth from the one end of the panel to the other can be used. These sloping grooves will in this case form a number of mutually adjacent sloping planes, which convey the liquid to the screening devices.

In FIGS. 7 and 8, the sloping planes have been shown disposed beneath the sack. Alternatively, they can be situated in the sack, the bottom of which then rests upon the hatches 24. The sloping planes 8 are in this case made of fairly cheap material, since they will remain in the sack when this is exchanged.

Figure 10:
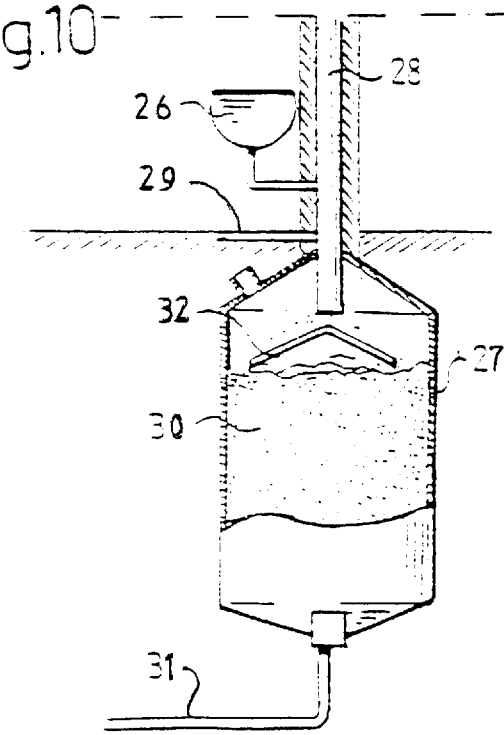
FIG. 10 shows a device for use in the conversion of urine.

In FIG. 10 a supplement to the above-described composting device is shown, for the management of pure urine. Installed in the toilet housing is a urinal 26, which is connected to an underlying tank 27 having an aeration facility 28. A grate for the collection of spillage is denoted by 29, which spillage is also delivered to the tank 27. The air duct 28 should if appropriate be separated from the channel through which urine is delivered to the tank 27.

The tank is full of a compost material which breaks down the urine into an almost odourless nutrient liquid as a result of a microbial process. In the course of the conversion, the volume is considerably reduced, the nutrient liquid drawn off through the drainage pipe 31 being able to have a volume of only 10 percent of the delivered volume of urine. A spreading plane, which spreads the urine as evenly as possible in the bed 30, is denoted by 32.

As a result of the effective conversion of urine into nutrient liquid which can be obtained with such a device, this principle can also be used in connection with water-rinsing toilets having urine separation. The urine separated in the toilet is in this case delivered to a device according to FIG. 10.

Even though a substantial conversion of urine into nutrient liquid with attendant volume reduction is effected in a composting device of the type described in connection with FIGS. 1–8, this process can be improved by connecting a tank 30 according to FIG. 10 to the pipe socket 14 shown in FIG. 3. The volume of nutrient liquid which then needs to be collected in the final tank is very small, which is a practical advantage.

The invention has been described above in connection with the embodiments shown in the drawings. These can however be modified in a number of respects within the scope of the patent claims. Each composting device can therefore comprise a sloping plane or a plurality of planes sloping towards each other, which planes can possibly be joined together to form a conical shape. The carrier 1 and the side walls 4 can also be varied according to wish, which also applies to necessary fixtures and locking devices.

What is claimed is:

1. Composting device for night soil and other biodegradable material, comprising a receptacle with supporting walls (4) for receiving the material (19) to be composted and on the bottom of which a starting bed is arranged, which receptacle comprises an inner, seal-tight lining in the form of a sack (10) made from a flexible, liquid-impermeable material and a carrier (1) intended to support the sack, the sack being constructed with liquid drains (14) for the drainage of liquid which is separated from the composting material (19), characterized in that the carrier (1) and the sack-lined receptacle are arranged such that they can be transported as a unit to a depot after the sack (10) has been wholly or partially filled, and in that the bottom of the carrier (1) is constructed with openable hatches (8; 24), which allow the sack (10) with its contents to be deposited in the depot through the said bottom when the carrier (1) and the receptacle are lifted.

2. Composting device according to claim 1, characterized in that the carrier (1) is constructed with bottom hatches (8; 24), which can be opened by being swung downwards in order to free the sack (10) as the carrier (1) is lifted.

3. Composting device according to claim 1, characterized by a screening device (20) which is disposed in the sack (10) and is connected to the liquid drains (14) of the sack.

4. Composting device according to claim 3, characterized in that the screening device (20) has the form of a perforated pipe extending over the bottom of the sack (10).

5. Composting device according to claim 1, characterized in that the carrier (1) is constructed with or bears a member having at least one sloping surface (8), which is/are arranged to serve as sloping plane(s) for the composting material (19) in the sack (10) and to achieve a separation and evacuation of liquid from the material.

6. Composting device according to claim 5, characterized in that the carrier (1) is constructed with or bears two planes (8) which slope towards each other, in that the bottom of the sack (10) is provided with a tubular screening device (20) which runs parallel to and along the lower edges of the sloping planes and is connected to the liquid drains (14) of the sack.

7. Composting device according to claim 5, characterized in that the carrier (1) is constructed with or bears two planes (8) which slope away from each other, in that the bottom of the sack (10) is provided with screening devices (20) which run parallel to and along the lower edge of each sloping plane, and in that the sack is provided with a liquid drain (14) at at least one end of each screening device.

8. Composting device according to claim 5, characterized in that the said sloping plane (8) is constructed with grooves (26) running in the direction of slope and in which liquid which is separated from the composting material (19) is conducted to the drains (14) of the sack (10).

9. Composting device according to claim 1, characterized in that the supporting walls (4) of the receptacle comprise wall sections mounted on the carrier (1), which form support for the sack.

10. Composting device according to claim 9, characterized in that the wall sections (4) have the form of stiff panels, the lower edges of which are fixed articularly to the carrier (1) by means of hinge-like members (2, 3, 5) and which wall sections, once mounted, are locked together to form a supporting shell for the sack (10).

11. Composting device according to claim 9, characterized in that it comprises a lid (11), which fits over the wall sections (4) mounted on the carrier (1), and which lid is constructed with necessary openings (12, 13) for the delivery of composting material to the sack (10) and for connection to ventilation ducts.

\* \* \* \* \*